US010609863B2

(12) United States Patent
Brunner et al.

(10) Patent No.: US 10,609,863 B2
(45) Date of Patent: Apr. 7, 2020

(54) MOWER DECK GAUGE WHEEL ADJUSTMENT MECHANISM (71) Applicant: Deere & Company, Moline, IL (US)

(72) Inventors: Ronald E. Brunner, Elroy, WI (US); Maxwell G. Anderson, Hartford, WI (US)

(73) Assignee: DEERE & COMPANY, Moline, IL (US)

(*) Notice: Subject to any disclaimer, the term of this patent is extended or adjusted under 35 U.S.C. 154(b) by 241 days.

(21) Appl. No.: 15/665,483

(22) Filed: Aug. 1, 2017

(65) Prior Publication Data
US 2019/0037768 A1 Feb. 7, 2019

(51) Int. Cl.
A01D 34/00 (2006.01)
A01D 34/63 (2006.01)
A01D 34/74 (2006.01)
A01D 34/66 (2006.01)
A01D 101/00 (2006.01)

(52) U.S. Cl.
CPC ............ A01D 34/63 (2013.01); A01D 34/66 (2013.01); A01D 34/74 (2013.01); A01D 34/00 (2013.01); A01D 2101/00 (2013.01)

(58) Field of Classification Search
CPC ........ A01D 34/63; A01D 34/66; A01D 34/74; A01D 34/00; A01D 2101/00
USPC ........................................................ 56/17.2
See application file for complete search history.

(56) References Cited

U.S. PATENT DOCUMENTS

| 2,485,312 | A | * | 10/1949 | Powell | A01D 34/62 |
| | | | | | 280/47.15 |
| 2,507,758 | A | * | 5/1950 | Daggett | A01D 34/475 |
| | | | | | 56/15.3 |
| 2,728,582 | A | * | 12/1955 | Knarzer | A01D 34/74 |
| | | | | | 280/43 |
| 3,035,386 | A | * | 5/1962 | Jepson | F16H 13/02 |
| | | | | | 180/19.1 |
| 3,043,604 | A | * | 7/1962 | Rehnberg | A01D 34/74 |
| | | | | | 280/43 |
| 3,334,911 | A | * | 8/1967 | Enters | A01D 34/74 |
| | | | | | 16/19 |
| 3,680,880 | A | | 8/1972 | Blaauw | |
| 3,755,998 | A | | 9/1973 | Hoffmeyer | |
| 4,248,034 | A | * | 2/1981 | Jackson | A01D 34/74 |
| | | | | | 280/43 |
| 4,905,463 | A | * | 3/1990 | Eilles | A01D 34/74 |
| | | | | | 280/43.13 |
| 5,136,829 | A | | 8/1992 | Sebben et al. | |
| 5,179,823 | A | * | 1/1993 | Pace | A01D 43/16 |
| | | | | | 56/16.9 |
| 5,241,810 | A | * | 9/1993 | Reichen | A01D 34/54 |
| | | | | | 56/17.1 |

(Continued)

Primary Examiner — Thomas B Will
Assistant Examiner — Mai T Nguyen (57) ABSTRACT A mower deck gauge wheel adjustment mechanism includes a support attached to a multi-blade mower deck having a vertical bore. A post is welded to a yoke holding a gauge wheel, and includes a plurality of horizontal grooves, and may be inserted through the vertical bore and positioned at a selected gauge wheel height. A horizontal latch hole may be provided through the support and has a diameter that overlaps the vertical bore. A latch may be inserted through the latch hole, with a first side that engages one of the horizontal grooves when the latch is pivoted downwardly to an engaged position.

16 Claims, 6 Drawing Sheets (56) References Cited

U.S. PATENT DOCUMENTS

| | | | |
|---|---|---|---|
| 5,355,665 A | 10/1994 | Peter | |
| 5,410,865 A | 5/1995 | Kurohara et al. | |
| 5,845,471 A | 12/1998 | Seegert et al. | |
| 6,000,202 A | 12/1999 | Laskowski | |
| 6,041,584 A | 3/2000 | Hohnl | |
| 6,205,754 B1 | 3/2001 | Laskowski | |
| 6,651,415 B2 * | 11/2003 | Burke | A01D 34/54 56/17.2 |
| 6,899,345 B1 * | 5/2005 | Bearden | A01D 34/74 16/19 |
| 7,716,907 B2 | 5/2010 | Joliff et al. | |
| 2006/0096267 A1 * | 5/2006 | Tarver | A01D 34/74 56/17.2 |

\* cited by examiner

MOWER DECK GAUGE WHEEL ADJUSTMENT MECHANISM

FIELD OF THE INVENTION

This invention relates to grass mowing machines and more specifically to a mower deck gauge wheel adjustment mechanism.

BACKGROUND OF THE INVENTION

Grass mowing machines with multi-blade mower decks have gauge wheels that ride on the ground below the deck. Gauge wheels help maintain the mower deck and rotary cutting blades at a specified distance above the ground, and help prevent scalping of grass. It is sometimes desirable to cut grass at different heights, so adjustment mechanisms may be provided to raise and lower the gauge wheels relative to the mower deck.

Examples of mower deck gauge wheel adjustment mechanisms are shown in U.S. Pat. No. 3,680,880 for Implement mounting and lift arrangement, U.S. Pat. No. 3,755,998 for Adjustable lawn mower roller support, U.S. Pat. No. 5,136,829 for Mower deck depth gauge attachment, U.S. Pat. No. 5,355,665 for Full flotation mower deck, U.S. Pat. No. 5,410,865 for Mid-mount type riding lawn tractor, U.S. Pat. No. 5,845,471 for Adjustable gauge wheel for mower deck, U.S. Pat. No. 6,000,202 for Apparatus for supporting a cutting blade on a mower, U.S. Pat. No. 6,041,584 for Adjustable gauge wheel support structure, U.S. Pat. No. 6,205,754 for Apparatus and method for supporting a cutting blade on a mower, and U.S. Pat. No. 7,716,907 for Height of cut adjustment mechanism for rotary cutting deck.

A mower deck gauge wheel adjustment mechanism for large multi-blade mower decks is needed having reduced cost, reduced parts count, reduced manufacturing complexity, and reduced part movement. A mower deck gauge wheel adjustment mechanism is needed with closely spaced height increments to improve grass cut quality.

SUMMARY OF THE INVENTION

A mower deck gauge wheel adjustment mechanism includes a support with a sleeve shaped body and a vertical bore. The mechanism includes a post having a lower end holding a gauge wheel and an upper end with a plurality of horizontal grooves that is inserted through the vertical bore. An L-shaped wire form latch having a horizontal axis may extend through a horizontal latch hole in the support and overlaps the vertical bore. The latch engages one of the horizontal grooves in an engaged position. The latch may be biased to the disengaged position, and may translate horizontally when pivoted between the engaged and the disengaged positions.

DESCRIPTION OF THE PREFERRED EMBODIMENT

Figure 1:
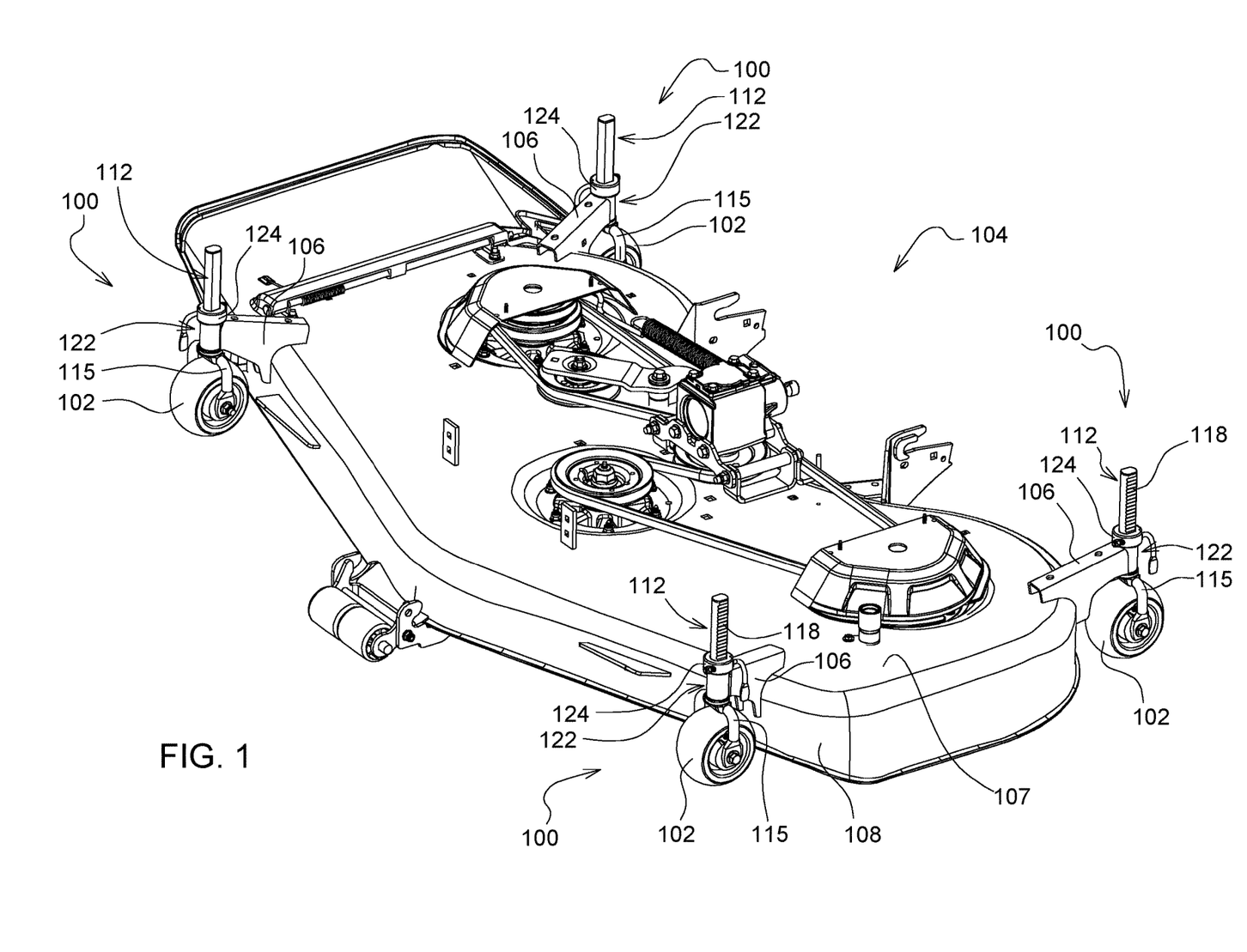
FIG. 1 is a perspective view of a multi-blade mower deck with four mower deck gauge wheel adjustment mechanisms according to a first embodiment of the invention.

FIGS. 1-6 show an embodiment of mower deck gauge wheel adjustment mechanism 100. Each mower deck gauge wheel adjustment mechanism may support a gauge wheel 102. As shown in FIG. 1, four mower deck gauge wheel adjustment mechanisms may be included on multi-blade mower deck 104. Each mower deck gauge wheel adjustment mechanism may be attached to the mower deck with bracket 106 welded or fastened onto the top 107 and/or skirt 108 of the mower deck.

Figure 2:
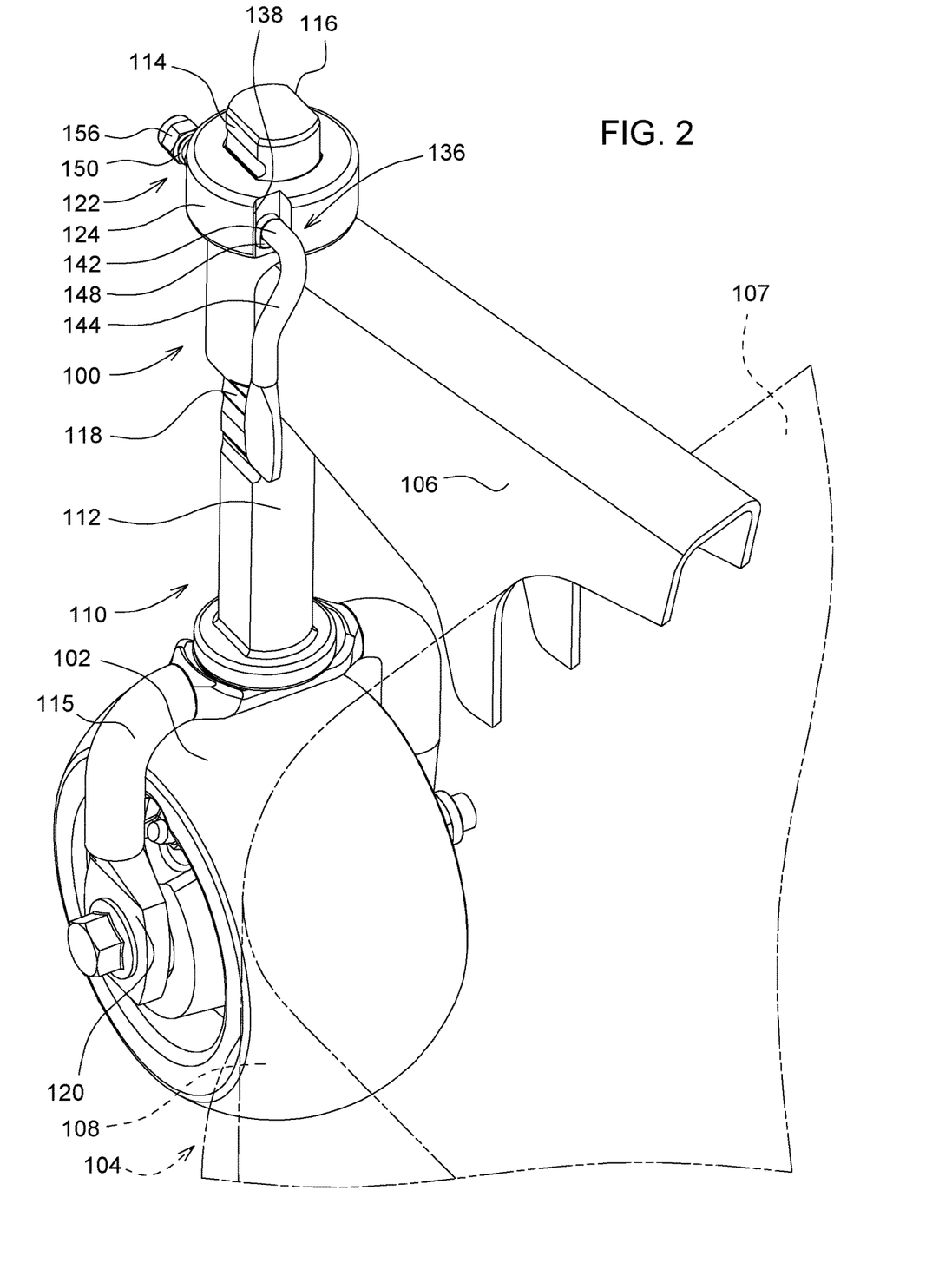
FIG. 2 is a perspective view of a mower deck gauge wheel adjustment mechanism according to a first embodiment of the invention.
Figure 3:
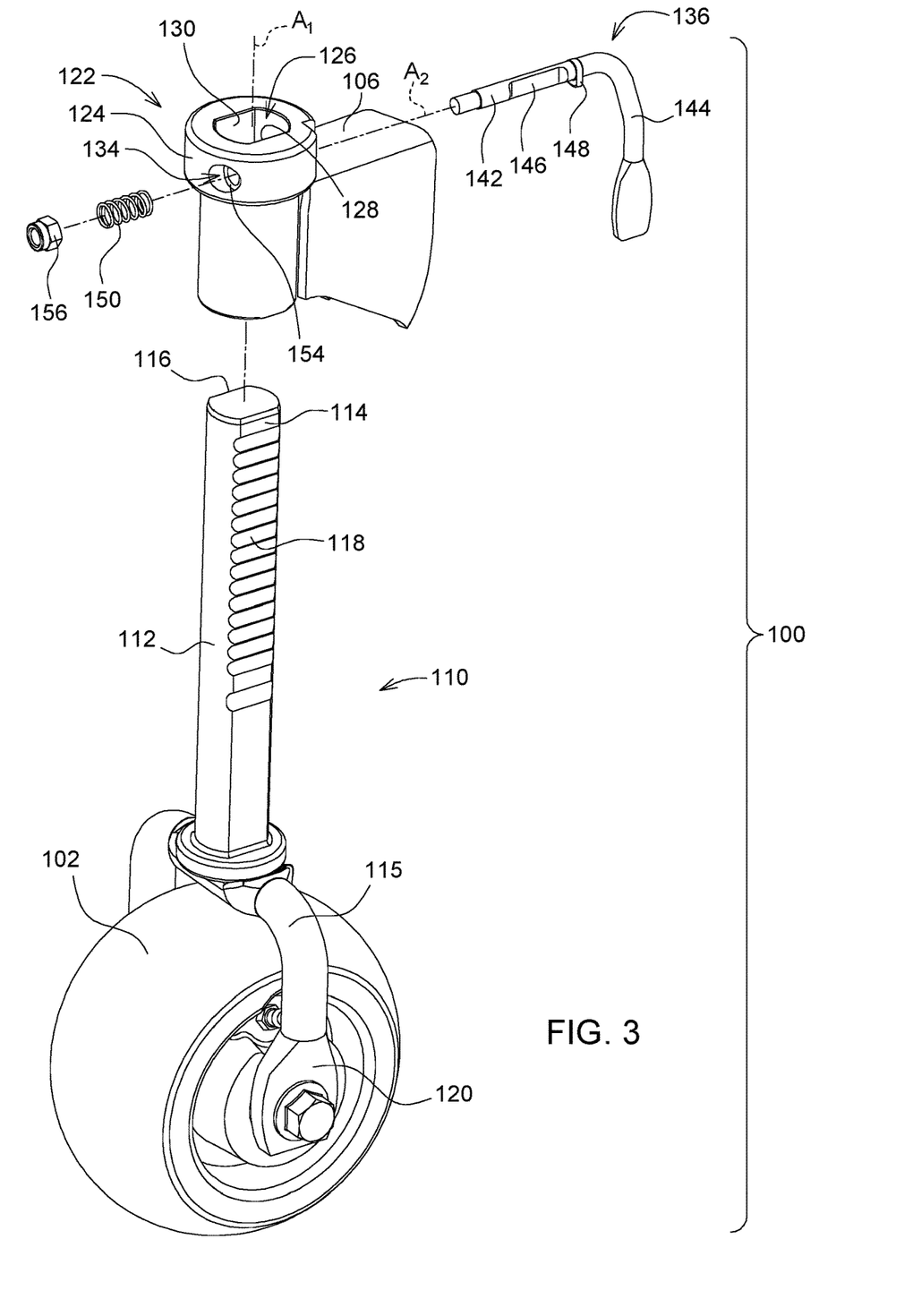
FIG. 3 is an exploded perspective view of a mower deck gauge wheel adjustment mechanism according to a first embodiment of the invention.

In one embodiment, each mower deck gauge wheel adjustment mechanism 100 may include yoke weldment 110 consisting of post 112 and yoke 115. Post 112 may be a generally vertically aligned steel rod with first and second generally flat regions 114, 116 on opposite sides of the post. Yoke 115 may be an inverted U-shaped member welded to the lower end of the post. Yoke 115 may include bearing 120 for rotatably mounting gauge wheel 102. A plurality of horizontal machine grooves or scallops 118 may be provided in one side of the post, and preferably in first flat surface 114.

In one embodiment, mower deck gauge wheel adjustment mechanism 100 may include support 122 that adjustably supports yoke weldment 110. Support 122 may be welded to bracket 106 which may be attached to the mower deck. Support 122 may have a sleeve shaped body 124 with a generally vertical bore 126 that may slidably receive post 112. First and second flat regions 128, 130 may be provided on opposite sides of bore 126 for sliding engagement with the first and second flat regions 114, 116 of post 112. As a result, post 112 may be aligned so that it cannot rotate on vertical axis $A_1$ of bore 126.

Figure 4:
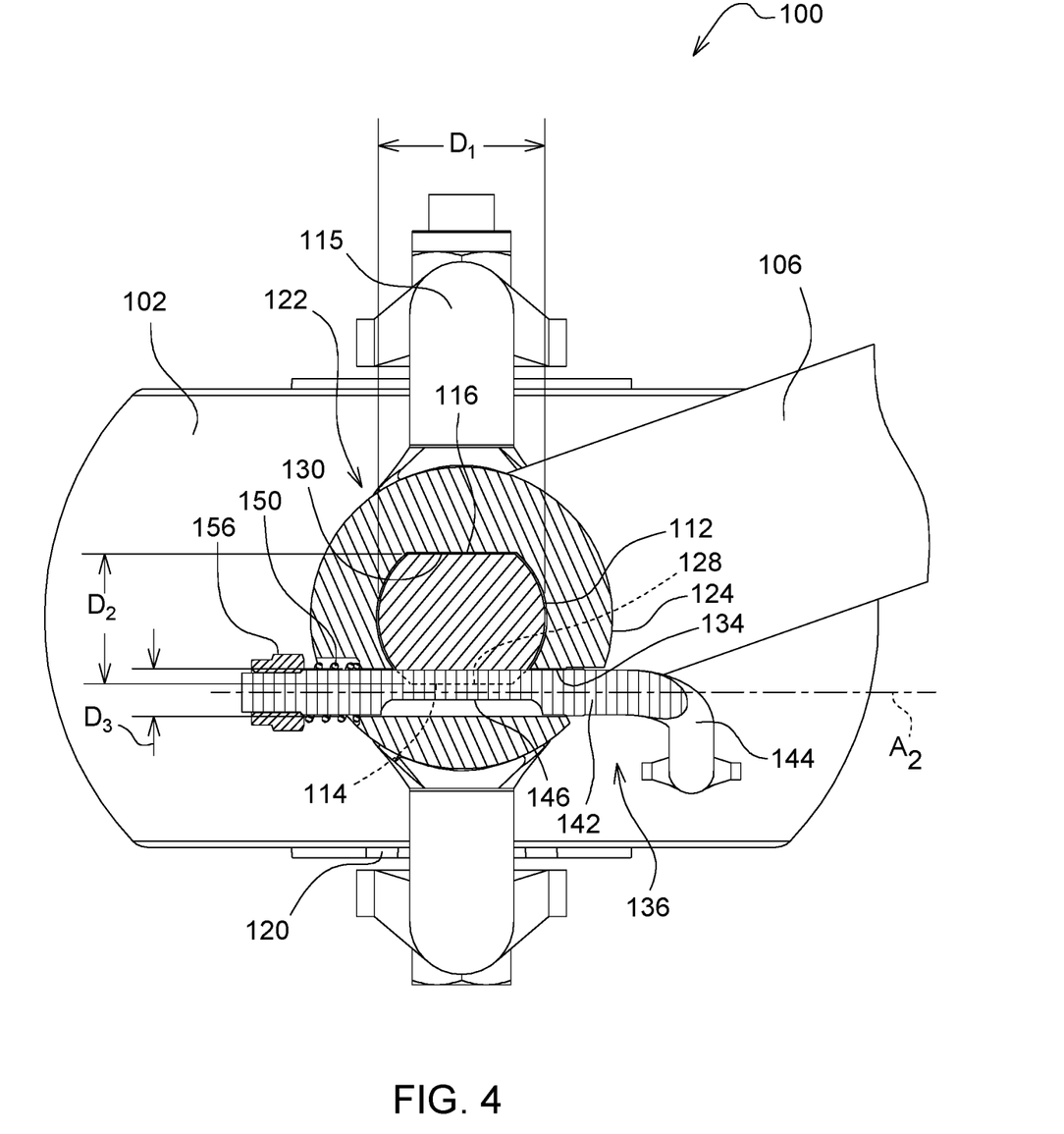
FIG. 4 is a top sectional view of a mower deck gauge wheel adjustment mechanism in the engaged position according to a first embodiment of the invention.
Figure 5:
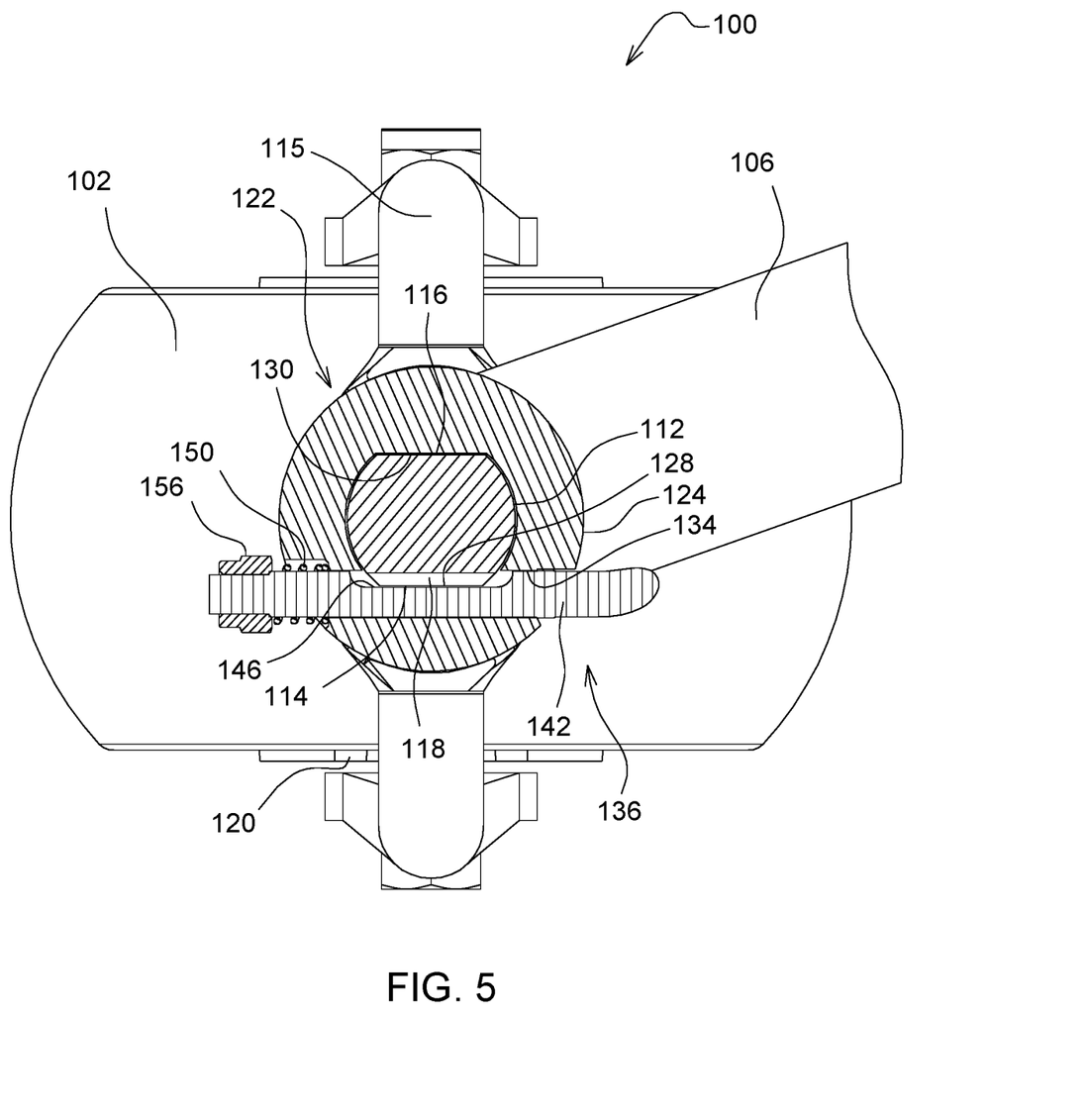
FIG. 5 is a top sectional view of a mower deck gauge wheel adjustment mechanism in the disengaged position according to a first embodiment of the invention.

In one embodiment, mower deck gauge wheel adjustment mechanism 100 may include latch hole 134 having a generally horizontal axis $A_2$. Latch hole 134 may be drilled horizontally through support 122 at a position radially outwardly from the vertical axis $A_1$ of bore 126. Latch hole 134 may have a diameter $D_3$ that overlaps vertical bore 126, and preferably overlaps the flat region 128 of bore 126.

In one embodiment, mower deck gauge wheel adjustment mechanism 100 may include a horizontally aligned L-shaped wire form latch 136. The horizontally aligned latch 136 may have a first leg 142 and a second leg 144, and a wire diameter of about 7.0. First leg 142 may be inserted through latch hole 134, and second leg 144 may be outside latch hole 134. An operator may manually pivot the horizontally aligned latch between a lowered, engaged position and a raised, disengaged position. In the lowered, engaged position, the latch's first leg 142 may engage grooves or scallops 118 in post 112. For example, in the engaged position, the latch's full or maximum diameter may face and engage grooves or scallops 118, preventing vertical sliding movement of the post within the support. In the raised, disengaged position, the latch's first leg 142 does not engage grooves or scallops 118. For example, in the disengaged position, the opposite side of the first leg may have a reduced diameter or notch 146 that faces grooves or scallops 118 without engaging them, but allows vertical sliding movement of the post within the support.

Figure 6:
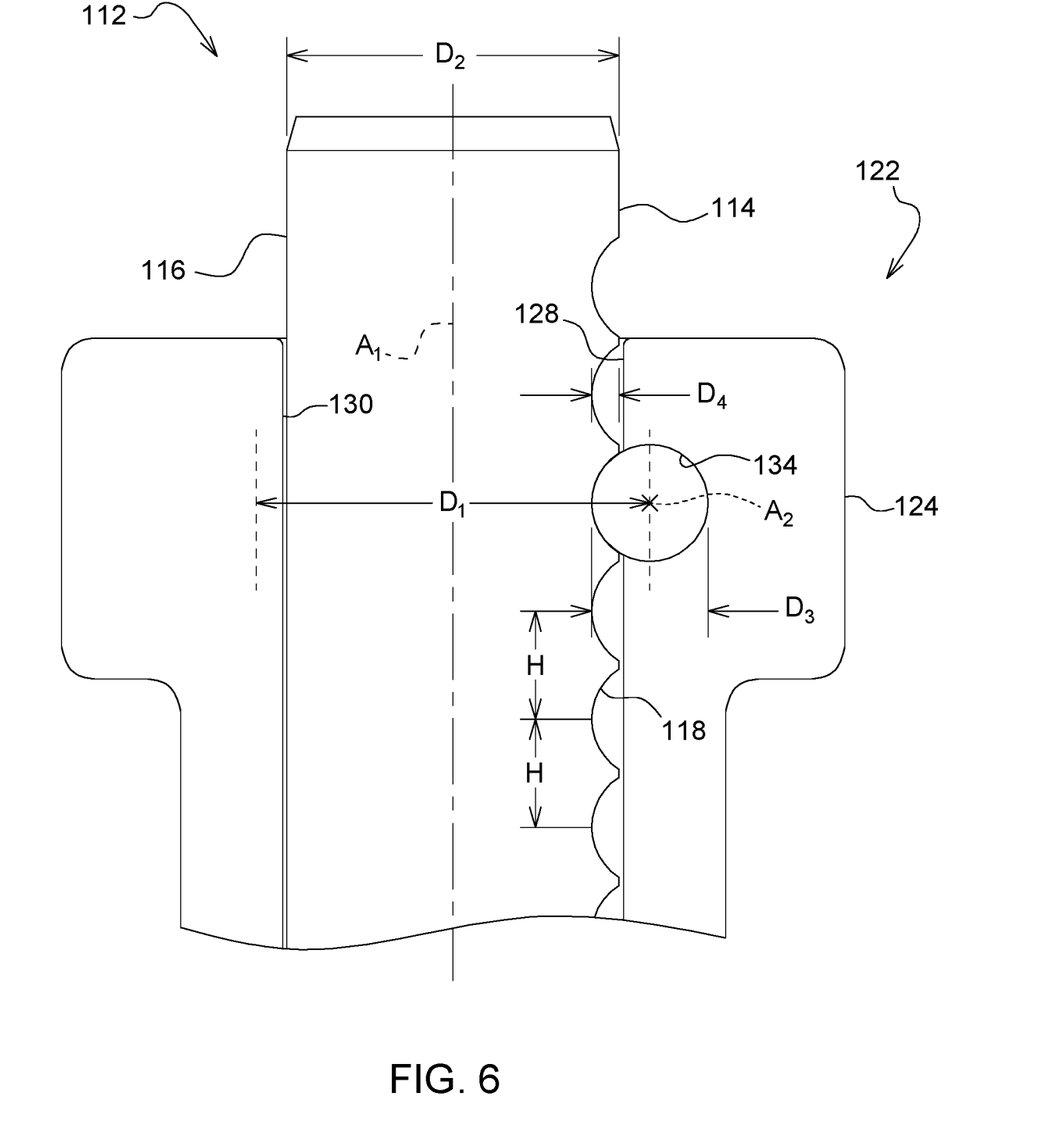
FIG. 6 is a side view of an upper portion of the post and support of a mower deck gauge wheel adjustment mechanism according to a first embodiment of the invention.

In one embodiment, as shown in FIG. 6, mower deck gauge wheel adjustment mechanism 100 may include a plurality of grooves or scallops 118 spaced apart at height increments H as small as about ¼ inch. Each groove or scallop may support the gauge wheel at a specified height. Post 112 may have a full or maximum diameter $D_1$ of about 22 mm, and a reduced width $D_2$ of about 19 mm to 20 mm between first and second flat surfaces 128, 130. Latch hole 134 may have a diameter $D_3$ substantially smaller than $D_1$ or $D_2$, and preferably between about 6 mm and about 7 mm. Latch hole 134 may have a horizontal axis $A_2$ that is outside diameter $D_2$, and is tangential to diameter $D_1$. Each groove or scallop 118 may provide one of a plurality of gauge wheel heights when positioned next to horizontal axis $A_2$ of latch hole 134 and engaged by the full or maximum diameter of horizontally aligned latch 136. Each groove or scallop 118 may have a depth $D_4$ of about 2 mm measured from first flat surface 114.

In one embodiment, mower deck gauge wheel adjustment mechanism 100 may include a biasing arrangement that helps urge and hold the horizontally aligned latch in the engaged position. The biasing arrangement may include collar 148 on the first leg of latch 136, inclined shoulder 138 on the outer surface of support 122 adjacent latch hole 134, and coil spring positioned around the first leg of the latch, captured between shoulder 154 of latch hole 134 and nut 156 threaded onto the end of the latch's first leg. An operator may move latch 136 from the engaged position to the disengaged position by pivoting the second leg of the latch upwardly at least about 90 degrees on the horizontal axis. Pivoting the latch up moves the reduced diameter or notch 146 into the disengaged position facing the grooves or scallops of the post. Pivoting the latch up also moves collar 148 onto inclined shoulder 138. Moving the collar onto the inclined shoulder forces the latch to translate horizontally about 1 mm to about 2 mm which compresses coil spring 150. As a result, the biasing arrangement, along with gravity acting on the second end of the latch, helps hold the latch in the engaged position.

In one embodiment, the mower deck gauge wheel adjustment mechanism reduces cost, reduces parts count, reduces manufacturing complexity, and reduces part movement compared to other mechanisms. Additionally, the mower deck gauge wheel adjustment mechanism also may provide more closely spaced height increments to improve grass cut quality.

Having described a preferred embodiment, it will become apparent that various modifications can be made without departing from the scope of the invention as defined in the accompanying claims.

The invention claimed is:

1. A mower deck gauge wheel adjustment mechanism, comprising:
    a support attached to a multi-blade mower deck; the support having a vertical bore with a pair of opposing flat regions;
    a post welded to a yoke holding a gauge wheel; the post having a pair of opposing flat regions and a plurality of horizontal grooves in one of the flat regions; the post inserted through the vertical bore and positioned at a selected gauge wheel height;
    a horizontal latch hole through the support and having a diameter that overlaps one of the flat regions of the vertical bore; and
    a latch inserted through the latch hole; the latch having a horizontal axis with a first side that is engaged to one of the horizontal grooves when the latch is pivoted on its horizontal axis to an engaged position, and a second side that is not engaged to the horizontal grooves when the latch is pivoted on its horizontal axis to a disengaged position.

2. The mower deck gauge wheel adjustment mechanism of claim 1 wherein the latch is biased to the engaged position.

3. The mower deck gauge wheel adjustment mechanism of claim 2, further comprising a collar on the latch, the collar sliding on an inclined shoulder and compressing a spring around the latch to move to the disengaged position.

4. The mower deck gauge wheel adjustment mechanism of claim 1, further comprising a notch on the second side of the latch.

5. The mower deck gauge wheel adjustment mechanism of claim 1, wherein the latch is L-shaped with a first leg forming the horizontal axis inserted through the latch hole and a second leg outside the latch hole.

6. A mower deck gauge wheel adjustment mechanism, comprising:
    a horizontally aligned latch pivotable on a horizontal axis of the latch between an engaged position and a disengaged position;
    a vertical post rotatably holding a gauge wheel on a multi-blade mower deck and having a plurality of horizontal grooves; the horizontally aligned latch engaging one of the horizontal grooves in the engaged position and not engaging any of the horizontal grooves in the disengaged position;
    the vertical post and horizontally aligned latch extending through a support attached to the multi-blade mower deck; and
    a spring biasing the horizontally aligned latch to the engaged position.

7. The mower deck gauge wheel adjustment mechanism of claim 6, wherein the horizontally aligned latch includes a first side having a maximum diameter that engages one of the horizontal grooves, and a second side having a reduced diameter that does not engage any of the horizontal grooves.

8. The mower deck gauge wheel adjustment mechanism of claim 6, wherein the horizontal grooves are in a flat region on a side of the vertical post.

9. The mower deck gauge wheel adjustment mechanism of claim 6, wherein the horizontally aligned latch moves axially to compress the spring to move to the disengaged position.

10. The mower deck gauge wheel adjustment mechanism of claim 6, wherein the horizontally aligned latch is a wire form.

11. A mower deck gauge wheel adjustment mechanism, comprising:
    a support with a sleeve shaped body and vertical bore attached to a multi-blade mower deck;
    a post having a lower end holding a gauge wheel and an upper end with a plurality of horizontal grooves inserted through the vertical bore; and
    an L-shaped wire form latch having a horizontal axis and extending through a horizontal latch hole through the support and overlapping the vertical bore, the latch engaging one of the horizontal grooves in an engaged position and not engaging any of the horizontal grooves in a disengaged position; the latch biased to the disengaged position; the latch translating horizontally when pivoted between the engaged and the disengaged positions.

12. The mower deck gauge wheel adjustment mechanism of claim 11, wherein the post has a flat region on a first side and a flat region on a second opposite side; the horizontal grooves being in one of the flat regions.

13. The mower deck gauge wheel adjustment mechanism of claim 11, wherein the vertical bore has a flat region on a first side and a flat region on a second opposite side.

14. The mower deck gauge wheel adjustment mechanism of claim 11, further comprising a spring around the latch biasing the latch toward the engaged position.

15. The mower deck gauge wheel adjustment mechanism of claim 11, wherein the latch includes a notch on one side thereof.

16. The mower deck gauge wheel adjustment mechanism of claim 11, wherein the latch includes a reduced diameter on one side thereof.

* * * * *